(12) United States Patent
Feldhues et al.

(10) Patent No.: US 7,682,444 B2
(45) Date of Patent: Mar. 23, 2010

(54) PROCESS FOR PREPARING PIGMENTS

(75) Inventors: Ulrich Feldhues, Bergisch Gladbach (DE); Frank Linke, Köln (DE); Ronald Göbel, Leverkusen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 348 days.

(21) Appl. No.: 11/824,787

(22) Filed: Jul. 3, 2007

(65) Prior Publication Data

US 2008/0057417 A1  Mar. 6, 2008

(30) Foreign Application Priority Data

Jul. 13, 2006  (DE)  ........................ 10 2006 032 591

(51) Int. Cl.
*C09B 67/20* (2006.01)
*C09B 67/02* (2006.01)
*C09B 67/42* (2006.01)
*C09B 45/22* (2006.01)
*C07F 15/04* (2006.01)
*C07D 241/28* (2006.01)
*C07D 241/18* (2006.01)
*C07D 251/54* (2006.01)

(52) U.S. Cl. ................. 106/496; 106/493; 544/225
(58) Field of Classification Search ............... 106/496, 106/493; 430/7; 544/225
See application file for complete search history.

(56) References Cited

U.S. PATENT DOCUMENTS

| 4,622,391 | A * | 11/1986 | Lorenz et al. | ............. | 534/707 |
| 6,211,346 | B1 * | 4/2001 | Linke et al. | ............. | 106/496 |
| 6,261,358 | B1 * | 7/2001 | Sommer et al. | ............. | 106/496 |
| 6,281,338 | B1 | 8/2001 | Sommer et al. | ............. | 534/581 |
| 6,350,307 | B1 | 2/2002 | Linke et al. | ............. | 106/496 |
| 6,596,446 | B2 | 7/2003 | Wolf et al. | ............. | 430/7 |
| 7,033,429 | B2 * | 4/2006 | Balliello | ............. | 106/499 |
| 7,081,160 | B2 | 7/2006 | Hamada | ............. | 106/496 |

FOREIGN PATENT DOCUMENTS

DE  10328999 A1 * 1/2005

JP  2005-272688 A1 * 10/2005

* cited by examiner

*Primary Examiner*—Anthony J Green
(74) *Attorney, Agent, or Firm*—Michael A. Miller

(57) ABSTRACT

Process for preparing pigments of the formula (I)

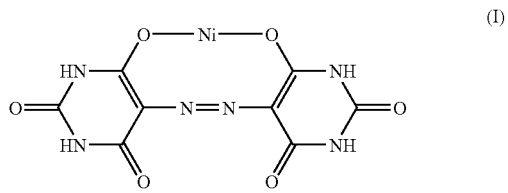

or tautomeric structures thereof and their hydrates, containing melamine as guest, characterized in that a mixture of the azobarbituric mono-cation salt (II) and the azobarbituric di-cation salt (III) is reacted with a nickel compound and melamine,

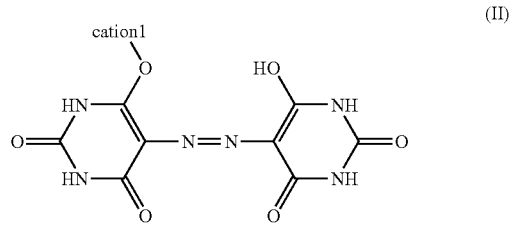

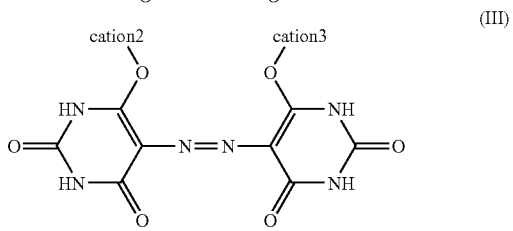

in which cation1, cation2 and cation3 independently of one another are any desired univalent cations or the fraction of any desired multivalent cation that corresponds to a positive charge of one.

12 Claims, No Drawings

PROCESS FOR PREPARING PIGMENTS

The invention relates to a process for preparing melamine-hosting pigments, their hydrates, and the use of these process products.

It is known that in the preparation of azobarbituric acid Ni complexes containing melamine as guest, and their hydrates, there are severe fluctuations in product properties. Especially under production conditions on the industrial scale, particularly in a batch process, certain parameters of the resulting material, such as the BET specific surface area, are subject to more or less severe fluctuations. This is of course a disadvantage—what the consumers of these products want is consistent product quality.

A certain standardization in product quality (reproducibility) is possible by means of a heat-treatment step, as described for example in EP-A1-0994162 or DE 10328999 A1. Particularly on the industrial scale, of course, this implies an additional, time-consuming step and hence an increase in manufacturing costs.

EP-A 1 612 246 describes likewise great quality fluctuations in the batch production of the Ni complex in accordance with the prior art, and proposes avoiding this disadvantage by means of specific additions at the synthesis stage. This, of course, necessitates additional logistical effort and expense, and affects the composition of the product, since some or all of these additions are incorporated as guests into the Ni complex in place of melamine.

Surprisingly it has now been found the quality and reproducibility of the azobarbituric acid Ni complex containing melamine as a guest can be improved significantly by reacting a mixture of the mono- and the di-cation complex, in particular the mono- and the di-potassium complex, of azobarbituric acid with a nickel compound and with melamine. The compound of the formula (I) containing melamine as guest can be prepared, even industrially, by the process of the invention, reproducibly, with a directable surface area, a high colour strength and a very narrow particle-size distribution. This is particularly advantageous for the production of stable dispersions of low viscosity.

The invention accordingly provides a process for preparing pigments of the formula (I)

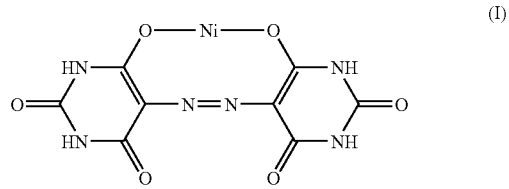

or tautomeric structures thereof and their hydrates, containing melamine as guest, which is characterized in that a mixture of the mono-salt of the formula (II) and the di-salt of the formula (III) is reacted with a nickel compound and melamine,

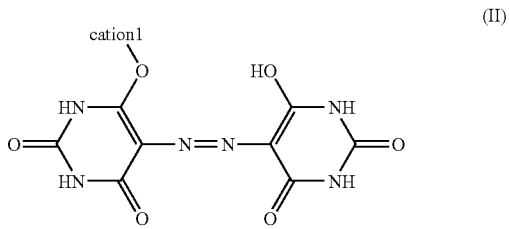

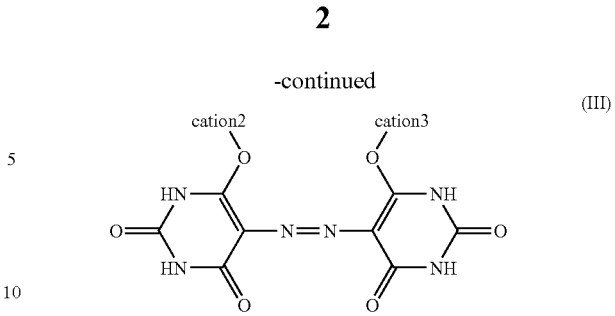

in which cation1, cation2 and cation3 independently of one another are any desired univalent cations (except for H) or the fraction of any desired multivalent cation that corresponds to a positive charge of one.

The compound (I) may contain not only melamine but also, where appropriate, further guest compounds, of the kind described for example in EP 0994162 (page 5, line 40 to page 7, line 58 therein). The compound (I) preferably has two guest melamine units.

As a mono-salt of the formula (II) it is preferred to use the lithium, sodium, potassium, magnesium, calcium, aluminium or ammonium salt, in particular the azobarbituric mono-potassium salt, and as a di-salt of the formula (III) it is preferred to use the lithium, sodium, potassium, magnesium, calcium, aluminium or ammonium salt, or a mixed salt of these where appropriate, in particular the azobarbituric di-potassium salt.

The azobarbituric monopotassium salt of the formula (II), in which cation1 stands for $K^+$, and the azobarbituric di-potassium salt of the formula (III), in which cation2 and cation3 each stand for $K^+$, are known from EP-A 1 086 992. EP-A 1 086 992 also describes a process for preparing the compound (I), but from the mono- or di-salts by reaction with nickel compounds and melamine. The pigments of the formula (I) prepared by the processes disclosed in EP 1086992 are already useful pigments.

With particular preference cation1, cation2 and cation3 in the formulae II and III are independently of one another an alkali metal cation, especially Li, Na or K cation, ½ alkaline earth metal cation, especially ½ Mg, ½ Ca cation, ⅓ Al cation, or ammonium cation unsubstituted or substituted by any desired radicals, especially unsubstituted ammonium cation.

Preferably this mixture contains 5-80 mol % of the di salt of the formula III, in particular 10-60 mol %, very preferably 10-40 mol %, based on the sum of mono- and di-salt of the formula II and III.

With particular preference cation1, cation2 and cation3 are each $K^\oplus$.

The mixture of the mono- and the di-salt II and III is preferably produced starting from the mono-salt II by adding a cation compound, for example an oxide, hydroxide, carbonate, phosphate, hydrogen phosphate, acetate, in particular by adding alkali metal hydroxide, trialkali metal phosphate or dialkali metal hydrogen phosphate, in the form for example of a solution or as a solid, directly from the monocation complex of azobarbituric acid. With particular preference it takes place by addition of a basic potassium compound, in particular by addition of potassium hydroxide, tripotassium phosphate or dipotassium hydrogen phosphate, in the form for example of a solution or else as a solid.

The mixture of the mono- and di-salt II and III is preferably reacted with a nickel salt and with melamine to compound (I) in an aqueous system at a temperature of 70 to 100° C.

In the reaction with the nickel salt the pH preferably falls below pH 3, in particular to a level of pH 1 to pH 2.

The reaction to compound (I) is preferably completed by subsequent stirring for one to three hours, in particular at temperatures between 90° C. and 100° C.

With very particular preference the mixture of the mono- and di-salt II and III in which cations 1, 2 and 3 are in each case potassium is reacted first with a nickel salt and then with melamine.

The pigments obtained by the process of the invention can of course be aftertreated by a heat-treatment step, of the kind described for example in EP A1-0994162 or DE 10328999 A1. Advantageously, however, this aftertreatment may also be omitted entirely.

The suspension obtained in the preparation is preferably filtered, and the resultant presscake can be dried, where appropriate after washing with water.

Suitable in this context on the one hand are typical drying methods such as paddle drying, etc. With drying methods of this kind and with subsequent, conventional grinding of the pigment, pulverulent pigments are obtained.

The presscake is preferably spray-dried as an aqueous slurry. The slurry for spraying possesses a solids fraction preferably of 10% to 40% by weight, in particular 15% to 30% by weight.

Preferred pigments prepared by the process of the invention possess a BET surface area of >100 $m^2/g$, preferably greater than 110 $m^2/g$, in particular from 115 to 150 $m^2/g$, determined in accordance with DIN 66131.

The invention additionally provides a process for producing pigment preparations in which at least one inventively prepared pigment and at least one dispersant are mixed. Such pigment preparations are also inventive. These pigment preparations serve preferably for incorporation into aqueous systems.

In respect of suitable dispersants, reference may be made to the prior art, particularly EP-A1-0994164, page 8, line 56 to page 11, line 23, whose disclosure content is part of this application.

The invention further provides a photoresist which comprises at least one photocurable monomer and at least one photoinitiator and at least one pigment prepared by the process of the invention. The invention further provides colour filters and liquid-crystal displays produced from them, comprising at least one pigment prepared by the process of the invention.

In the case of the production of the colour filters for liquid-crystal displays, the inventively prepared pigment, preferably in an organic solvent, where appropriate with addition of a binder resin and/or dispersant, is ground, then processed to a photoresist with addition of photocurable monomers, photo-reaction initiators and, where appropriate, further binder and/or solvent, and this photoresist is then applied to a suitable substrate, generally a glass plate, by means of suitable coating techniques such as roller, spray, spin, dip or air-knife coating, for example, and the coated plate is exposed using a photomask, then cured and developed to give the completed coloured filter.

The invention additionally provides, preferably, for the use of the inventively prepared pigment as a pigment for colour filters in liquid-crystal displays.

The inventively prepared compound (I) containing melamine as guest, or pigment preparations thereof, are outstandingly suitable, moreover, for all pigment applications.

They are suitable, for example, for pigmenting varnishes of all kinds, for the production of printing colours, distemper colours or binder colours, for the mass coloration of synthetic, semisynthetic or natural macromolecular compounds, such as polyvinyl chloride, polystyrene, polyamide, polyethylene or polypropylene, for example. They can also be used for the spin-dyeing of natural, regenerated or artificial fibres, such as cellulose, polyester, polycarbonate, polyacrylonitrile or polyamide fibres, and also for the printing of textiles and paper. These pigments provide finely divided, stable, aqueous pigmentation of emulsion and paint colours which are useful for paper coloration, for the pigment printing of textiles, for laminate printing or for the spin-dyeing of viscose, by grinding or kneading in the presence of nonionic, anionic or cationic surfactants. The pigments prepared by the process of the invention are outstandingly suitable for inkjet applications and for colour filters for liquid-crystal displays.

EXAMPLES

Monopotassium Salt

Starting material for the process of the invention is Example 1 of EP-A 1 086 992, i.e. the α-form of azobarbituric acid monopotassium salt×1 $H_2O$, which is described below.

136 g of aminoguanidine bicarbonate are introduced into 810 g of distilled water and dissolved therein with 280 g of hydrochloric acid (30% strength). The solution is thereafter cooled down to about −10° C. with 780 g of ice and subsequently admixed with 232 g of 37% strength potassium nitrite solution in water to about 15° C. This is followed by 15 minutes of stirring at about 15° C., after which 2.0 g of amidosulphuric acid are added. Then 269 g of barbituric acid are introduced, and the mixture is subsequently heated to 55° C. and stirred for 2 hours. The mixture is then adjusted to a pH of 2.5 using aqueous potassium hydroxide solution and stirred for 30 minutes. Thereafter the pH is adjusted to 4.8 using aqueous potassium hydroxide solution and stirring is continued for 30 minutes. Subsequently the batch is heated to 80° C. and subsequently stirred at a pH of 4.8 for 3 hours. Thereafter the product is isolated on a suction filter and washed until electrolyte-free.

Non-Inventive, Comparative Example 425 g of water-moist paste of the α-form of azobarbituric acid monopotassium salt×1 $H_2O$, prepared according to Example 1 of EP-A 1 086 992, with a solids content of 40%, corresponding to 170 g dry (0.5 mol), are stirred in 5000 ml of distilled water with a laboratory stirrer and heated to 95° C. 1060 g of aqueous 6.5% strength nickel chloride solution are added over the course of 30 minutes. Thereafter 126 g of melamine (1 mol) are added and stirring is continued at 95° C. for 1.5 hours. The pH is then adjusted to 5.5 using potassium hydroxide solution. The product is subsequently isolated on a suction filter, washed until electrolyte-free, dried in a vacuum drying cabinet at 80° C. and ground.

The specific surface area is determined in accordance with DIN 66131: Determination of the specific surface area of solids by gas adsorption by the method of Brunauer, Emmett and Teller (B.E.T.).

The product has a BET surface area of 83 $m^2/g$.

Repeat syntheses show considerable variation (57 $m^2/g$ -92 $m^2/g$).

Inventive Example 1

425 g of water-moist paste of the α-form of azobarbituric acid monopotassium salt×1 $H_2O$, prepared according to Example 1 of EP 1086992, with a solids content of 40%, corresponding to 170 g dry (0.5 mol), are stirred in 5000 ml of distilled water with a laboratory stirrer and heated to 95° C.

42 g of 10% strength potassium hydroxide solution are added dropwise (0.075 mol; 15% based on azobarbituric monopotassium salt employed) and the mixture is stirred for 30 minutes. This gives a mixture in the molar proportion of 85 parts of monopotassium salt and 15 parts of dipotassium salt. 1060 g of aqueous 6.5% strength nickel chloride solution are added over the course of 30 minutes. Thereafter 126 g of melamine (1 mol) are added and stirring is continued at 95° C. for 1.5 hours. The pH is then adjusted to 5.5 using potassium hydroxide solution. The product is subsequently isolated on a suction filter, washed until electrolyte-free, dried in a vacuum drying cabinet at 80° C. and ground.

The specific surface area is determined in accordance with DIN 66131: Determination of the specific surface area of solids by gas adsorption by the method of Brunauer, Emmett and Teller (B.E.T.).

The product has a BET surface area of 129 $m^2/g$.

Repeat syntheses show minor variation (121 $m^2/g$-134 $m^2/g$).

Inventive Example 2

Reaction as in Example 1, but 28 g of 10% strength potassium hydroxide solution are added dropwise (0.05 mol; 10% based on azobarbituric monopotassium salt employed). This gives a mixture in the molar proportion of 90 parts of monopotassium salt and 10 parts of dipotassium salt.

The product has a BET surface area of 126 $m^2/g$.

Repeat syntheses show minor variation (120 $m^2/g$-135 $m^2/g$).

Inventive Example 3

Reaction as in Example 1, but 56 g of 10% strength potassium hydroxide solution are added dropwise (0.1 mol; 20% based on azobarbituric monopotassium salt employed). This gives a mixture in the molar proportion of 80 parts of monopotassium salt and 20 parts of dipotassium salt.

The product has a BET surface area of 131 $m^2/g$.

Repeat syntheses show minor variation (126 $m^2/g$-135 $m^2/g$).

Inventive Example 4

Reaction as in Example 1, but 84 g of 10% strength potassium hydroxide solution are added dropwise (0.15 mol; 30% based on azobarbituric monopotassium salt employed). This gives a mixture in the molar proportion of 70 parts of monopotassium salt and 30 parts of dipotassium salt.

The product has a BET surface area of 131 $m^2/g$.

Repeat syntheses show minor variation (131 $m^2/g$-144 $m^2/g$).

Inventive Example 5

Reaction as in Example 1, but 21.2 g of tripotassium phosphate are added (0.10 mol; 20% based on azobarbituric monopotassium salt employed). Tripotassium phosphate converts two units of azobarbituric monopotassium salt into azobarbituric dipotassium salt and in so doing becomes the dihydrogen phosphate.

This gives a mixture in the molar proportion of 60 parts of monopotassium salt and 40 parts of dipotassium salt.

The product has a BET surface area of 143 $m^2/g$.

Inventive Example 6

Reaction as in Example 1, but 17.4 g of dipotassium hydrogen are added (0.10 mol; 20% based on azobarbituric monopotassium salt employed). Dipotassium hydrogen converts one unit of azobarbituric monopotassium salt into azobarbituric dipotassium salt and in so doing becomes the dihydrogen phosphate.

This gives a mixture in the molar proportion of 80 parts of monopotassium salt and 20 parts of dipotassium salt.

The product has a BET surface area of 124 $m^2/g$.

The invention claimed is:

1. Process for preparing pigments of the formula (I)

[Structure (I): nickel complex of azobarbituric acid]

or tautomeric structures thereof and their hydrates, containing melamine as guest, wherein a mixture of the azobarbituric mono-cation salt (II) and the azobarbituric di-cation salt (III) is reacted with a nickel compound and melamine,

[Structure (II): azobarbituric mono-cation salt with cation1]

[Structure (III): azobarbituric di-cation salt with cation2 and cation3]

where cation1, cation2 and cation3 are not $H^+$ and in which cation1, cation2 and cation3 independently of one another are univalent cations or the fraction of multivalent cations that corresponds to a positive charge of one.

2. The Process according to claim 1, wherein cation1, cation2 and cation3 in the formulae (II) and (III) are independently of one another an alkali metal cation, ½ alkaline earth metal cation, are ⅓ Al cation or are unsubstituted or substituted ammonium cation.

3. The Process according to claim 1, wherein cation1, cation2 and cation3 in the formulae (II) and (III) are independently of one another an Li, Na, K cation, ½ Mg, ½ Ca cation, are ⅓ Al cation or are unsubstituted ammonium cation.

4. The Process according to claim 1, wherein cation1, cation2 and cation3 are each a K cation.

5. The Process according to claim 1, wherein the mixture contains 5%-80% by weight of the di-salt of the formula III, based on the sum of both salts II and III.

6. The Process according to claim 1, wherein the mixture contains 10-60 mol % by weight of the di-salt of the formula III, based on the sum of both salts II and III.

7. The Process according to claim 1, wherein the mixture of the azobarbituric mono-cation salt (II) and the azobarbituric di-cation salt (III) is produced starting from the monosalt II by adding a cation compound, in particular a cation oxide, a cation hydroxide, a cation phosphate or a cation hydrogen phosphate.

8. The Process according to claim 1, wherein the mixture of the azobarbituric mono-cation salt (II) and the azobarbituric di-cation salt (III) is produced starting from the monosalt II by adding a cation oxide, a cation hydroxide, a cation phosphate or a cation hydrogen phosphate.

9. The Process according to claim 1, wherein the mixture of the azobarbituric mono-cation salt (II) and the azobarbituric di-cation salt (III) is reacted first with a nickel salt and then with melamine.

10. The Process according to claim 1, wherein the pigments prepared possess a BET surface area, determined in accordance with DIN 66131, of greater than 100.

11. The Process according to claim 1, wherein the pigments prepared possess a BET surface area, determined in accordance with DIN 66131, of greater than 110 $m^2/g$.

12. Process according to claim 1, wherein the mixture of the azobarbituric mono-cation salt (II) and the azobarbituric di-cation salt (III) is reacted at pH<7 with a nickel salt and melamine.

* * * * *